United States Patent
Lipka et al.

(10) Patent No.: US 11,126,644 B2
(45) Date of Patent: Sep. 21, 2021

(54) AUTOMATIC DISCOVERY OF LOCATIONS OF TRANSLATED TEXT IN LOCALIZED APPLICATIONS

(71) Applicant: salesforce.com, inc., San Francisco, CA (US)

(72) Inventors: Hendrik Lipka, Jena (DE); Cornelia Charlotte Sittel, Arlington, MA (US)

(73) Assignee: salesforce.com, inc., San Francisco, CA (US)

( * ) Notice: Subject to any disclaimer, the term of this patent is extended or adjusted under 35 U.S.C. 154(b) by 106 days.

(21) Appl. No.: 16/263,978

(22) Filed: Jan. 31, 2019

(65) Prior Publication Data
US 2020/0250208 A1 Aug. 6, 2020

(51) Int. Cl.
| G06F 40/40 | (2020.01) |
| G06F 16/31 | (2019.01) |
| G06F 16/34 | (2019.01) |
| G06F 16/35 | (2019.01) |
| G06F 9/451 | (2018.01) |
| G06F 40/58 | (2020.01) |
| G06F 40/49 | (2020.01) |
| G06F 40/51 | (2020.01) |

(52) U.S. Cl.
CPC ............ *G06F 16/313* (2019.01); *G06F 9/454* (2018.02); *G06F 16/34* (2019.01); *G06F 16/35* (2019.01); *G06F 40/40* (2020.01); *G06F 9/451* (2018.02); *G06F 40/49* (2020.01); *G06F 40/51* (2020.01); *G06F 40/58* (2020.01)

(58) Field of Classification Search
None
See application file for complete search history.

(56) References Cited

U.S. PATENT DOCUMENTS 5,551,055 A * 8/1996 Matheny ............... G06F 9/454
710/62
5,664,206 A * 9/1997 Murow .................. G06F 40/55
704/8

(Continued)

OTHER PUBLICATIONS

Extended European Search Report issued in corresponding European Patent Application No. EP20154758, dated Jun. 30, 2020 (9 pages).

*Primary Examiner* — Richard Z Zhu
(74) *Attorney, Agent, or Firm* — Sterne, Kessler, Goldstein & Fox P.L.L.C.

(57) ABSTRACT

Disclosed herein are system, method, and computer-readable storage-medium embodiments for automatic discovery of translated text. An embodiment may include relating a user-interface (UI) output with a corresponding localization object in a code-base index and matching a first instance of a unique identifier with a second instance of the unique identifier. The first instance of the unique identifier may be located in a code base corresponding to the code-base index, and the second instance of the unique identifier may correspond to the UI output. The code base may be structured to comprise the unique identifier in a given context. Further operations may include retrieving a reference to the corresponding localization object of the UI output in response to a determination that the UI output is incorrect in the given context, and outputting the reference to the corresponding localization object.
The reference may be copied into a ticket of a tracking system.

21 Claims, 5 Drawing Sheets

(56) References Cited

U.S. PATENT DOCUMENTS

| | | | |
|---|---|---|---|
| 6,735,759 B1 | 5/2004 | Yamamoto et al. | |
| 7,103,875 B1* | 9/2006 | Kaneko | G06F 9/454 |
| | | | 717/125 |
| 7,698,126 B2* | 4/2010 | Kohlmeier | G06F 9/454 |
| | | | 704/8 |
| 7,941,484 B2* | 5/2011 | Chandler | H04L 43/0817 |
| | | | 709/204 |
| 8,010,910 B2* | 8/2011 | Wright | G06F 16/54 |
| | | | 715/854 |
| 9,262,405 B1* | 2/2016 | Baliga | G06F 40/58 |
| 9,501,471 B2 | 11/2016 | Bartley et al. | |
| 9,971,767 B1* | 5/2018 | Chang | G06F 40/44 |
| 2009/0094539 A1* | 4/2009 | Wang | H04N 1/00413 |
| | | | 715/762 |
| 2010/0070521 A1* | 3/2010 | Clinchant | G06F 16/3337 |
| | | | 707/760 |
| 2018/0188914 A1 | 7/2018 | Chen et al. | |

* cited by examiner

| Maturity Level | I18n Capabilities | Organizational Status | L10n Status |
|---|---|---|---|
| Level 0 - US only | Data that does not conform to native (=US) standards cannot be handled | Product is made exclusively for the US American market | No translations of anything |
| Level 1 - Data Only | Database supports UTF-8 or UTF-16; UI/UX not internationalized, non-US data formats can be entered, stored and returned | Ad-hoc demands of business are entered as defects, no defined i18n requirements, development is reactive, no clear ownership, no processes to track requirements, schedule, functionality, and cost | Typically UI is English only, no materials available in other languages |
| Level 2 - Extended ASCII Support (UI and data) | Database and UI can handle accented characters, different punctuation symbols as well as expansion of strings; date and time formats can be switched in UI, different currencies are supported | Sporadic attempts to formalize i18n requirements, recognition of limitations of global expansion given product constraints, i18n expertise being built, UX requirements start to include i18n, role and resources for l10n increase | Localization of UI into Western European languages happens, such as French, Italian, Spanish, German; some enablement materials such as documentation and training courses are translated |
| Level 3 - Multibyte Support (UI and data) | Database and UI can handle entering, storing and returning data in multibyte characters, UI supports text shrinking or vertical expansion | I18n requirements are often considered in design and development process, localization process is locked down, scalable and increasingly automated | Localization into Asian languages, such as CJK, is executed, growing number of enablement materials are translated such as sales presentations, knowledge base articles for support, eLearning courses etc.; L10n process is driven to more automation |
| Level 4 - Right to Left Support (UI and data) | UI supports bidirectional settings, end users to process information left-to-right and right-to-left are taken into account by UX | Commitment of design and development to support all international users, i18n engineering consistently executed, defects addressed with same priority as basic functionality | Localization into RTL languages such as Hebrew and Arabic happens; optimized L10n process with use of machine translation, e.g. ad-hoc machine translation for knowledge base articles |
| Level 5 - Full Global Support (UI and data) | SEO-friendly development, customizations to any locale possible; customers can provide their own translations | Internationalization requirements, tools and testing are integral part of product development process | Continuous improvements to localization process automation, customers can provide their own translations following Best Practice methodologies published by L10n group |

| Maturity Level | Configuration Settings |
|---|---|
| Level 0 – US Only | N/A |
| Level 1– Data Only | N/A |
| Level 2– Extended ASCII | Use data formatters according to user settings, not a global setting only |
| Level 3 – Multibyte Support | When storing data in a database, account for needing more bytes per character |
| Level 4 – Right-to-Left (RTL) Support | Need to change the layout of the UI to reflect a different text direction |
| Level 5 – Full Global Support | N/A |

FIG. 4

AUTOMATIC DISCOVERY OF LOCATIONS OF TRANSLATED TEXT IN LOCALIZED APPLICATIONS

CROSS-REFERENCE TO RELATED APPLICATIONS

This patent application is related to U.S. patent application Ser. No. 15/965,604, filed Apr. 27, 2018, which is a continuation-in-part of U.S. patent application Ser. No. 15/490,852, filed Apr. 18, 2017. Additionally, Ser. No. 15/965,604 is also a continuation-in-part of U.S. patent application Ser. No. 15/491,952, filed Apr. 19, 2017. All of the above-listed patent applications are hereby incorporated by reference in their entirety for all purposes.

BACKGROUND

During software localization, user interface (UI) translators may benefit from being able to see translations of text strings in the contexts where the strings appear. Such context may be helpful in some cases to verify correctness of the translated text strings in context, especially when the text strings may be sensitive to or dependent on context in general. For example, where text strings in a given language may require linguistic agreement or concord, e.g., person, number, gender, conjugation, declension (case), aspect, mode (mood), etc., context may be necessary to determine whether a translation of a given string is correct.

For example, in web applications, ascertaining context may require finding an exact web page and/or navigation path to get to where a specific translated string appears. Thus, with user interfaces for internationalized software, including web applications and web pages, finding a particular source of missing or incorrectly translated text in an application may be difficult. This difficulty may be greater for applications having code bases of greater size.

An exact location and context of a given text string, such as in a source code repository, may not be clear or readily ascertainable simply by searching the repository for the given text string by itself. String matching for specific text may yield a considerable number of false positives, and may fail for non-textual objects. Unique identifiers for text fields may have limited effectiveness. Even automated debugging tools or web crawlers, as may be used to test web applications, may have difficulty in locating text strings and their respective contexts.

Additionally, navigation in certain applications may consist of multiple steps or even involve entering specific data into form fields, for example. In some applications having large code bases, any instance of a specific string may be extremely difficult to find, requiring large amounts of time- and labor-intensive resources from translators and/or developers when making certain changes to content and/or UI components.

SUMMARY

Provided herein are system, apparatus, article of manufacture, method and/or computer program product embodiments, and/or combinations and sub-combinations thereof, for automatic discovery of locations of translated text, such as in localized applications, according to some embodiments.

An embodiment includes a computer-implemented method for automatic discovery of locations of translated text. According to this embodiment, at least one computer processor may be configured to perform operations such as relating a user-interface (UI) output with a corresponding localization object in a code-base index and matching a first instance of a unique identifier with a second instance of the unique identifier.

The first instance of the unique identifier may be located in a code base corresponding to the code-base index, and the second instance of the unique identifier may correspond to the UI output. The code base may be structured to comprise the unique identifier in a given context. Further operations may include retrieving a reference to the corresponding localization object of the UI output in response to a determination that the UI output is incorrect in the given context, and outputting the reference to the corresponding localization object.

Additionally, an embodiment may include a system with memory and at least one computer processor configured to relate a user-interface (UI) output with a corresponding localization object in a code-base index and match a first instance of a unique identifier with a second instance of the unique identifier.

The first instance of the unique identifier may be located in a code base corresponding to the code-base index, and the second instance of the unique identifier may correspond to the UI output. The code base may be structured to comprise the unique identifier in a given context. The at least one computer processor may be further configured to retrieve a reference to the corresponding localization object of the UI output in response to a determination that the UI output is incorrect in the given context, and output the reference to the corresponding localization object.

A further embodiment may include a computer-readable storage medium having instructions stored thereon. When executed by at least one computer processor, the instructions may cause the at least one computer processor to perform operations including relating a user-interface (UI) output with a corresponding localization object in a code-base index and matching a first instance of a unique identifier with a second instance of the unique identifier.

The first instance of the unique identifier may be located in a code base corresponding to the code-base index, and the second instance of the unique identifier may correspond to the UI output. The code base may be structured to comprise the unique identifier in a given context. Further operations may include retrieving a reference to the corresponding localization object of the UI output in response to a determination that the UI output is incorrect in the given context, and outputting the reference to the corresponding localization object.

BRIEF DESCRIPTION OF THE DRAWINGS

The accompanying drawings are incorporated herein and form a part of the specification.

FIG. 3 is a chart illustrating an example of an internationalization maturity model, according to an embodiment.

FIG. 4 is a chart illustrating an assessment of maturity of a web application under test, according to an embodiment.

The drawings are representative of embodiments of the invention. In the drawings, like reference numbers generally indicate identical or similar elements. Additionally, generally, the left-most digit(s) of a reference number identifies the drawing in which the reference number first appears.

DETAILED DESCRIPTION

Figure 1:
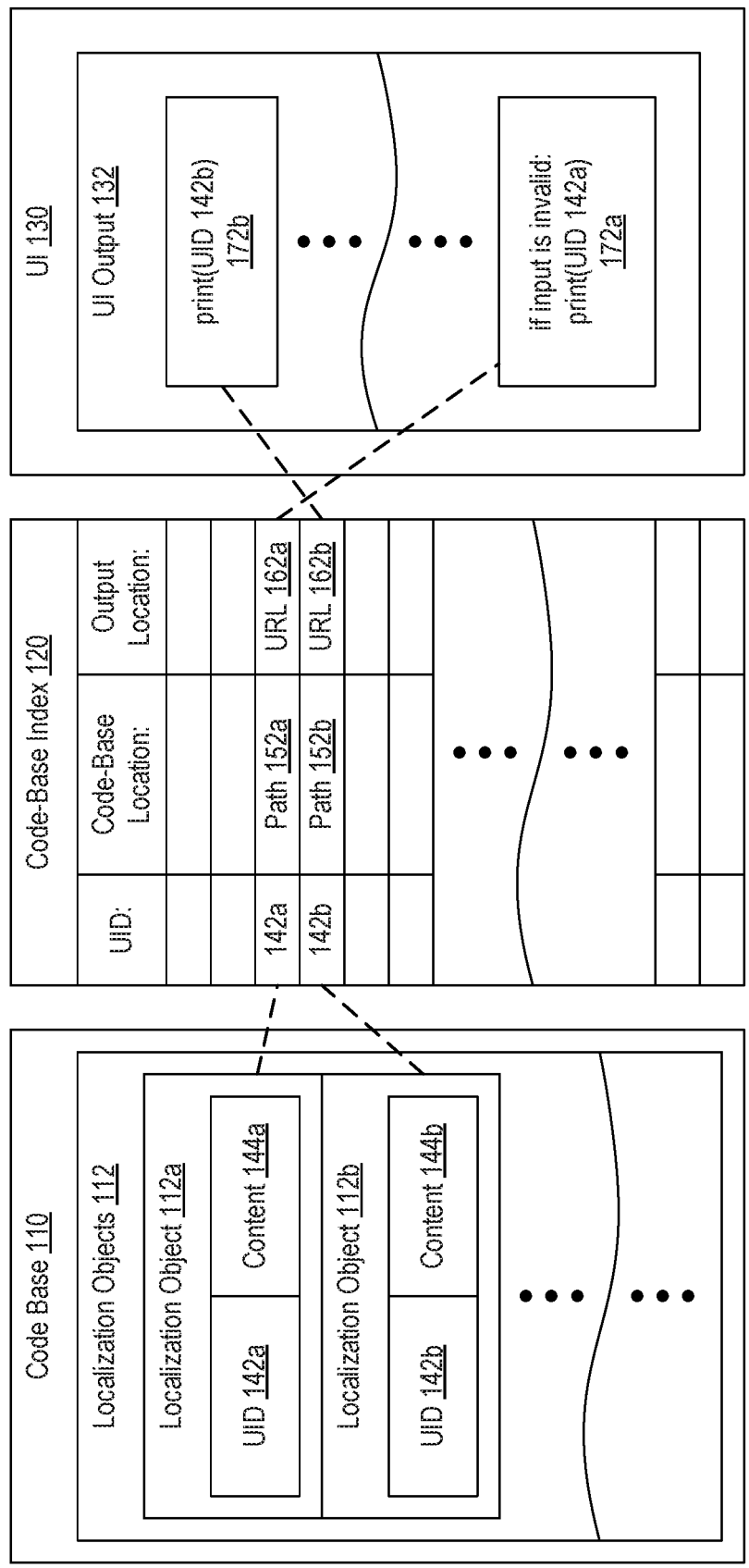
FIG. 1 is a block diagram illustrating an example architecture that may accommodate automatic text discovery in a web application, according to an embodiment.

Provided herein are system, method and/or computer program product embodiments, and/or combinations and sub-combinations thereof, for implementing automatic discovery of locations of translated text, such as in localized applications, according to some embodiments.

Text Discovery

According to some embodiments, text of an application, including in source code files or other data files, may be searched within a code base. The code base may be a repository, for example, or may include multiple repositories, such as a first repository for program source code and a second repository for localization data, translation files, key-value pairs, profiles, etc. In some cases, a code base or repository may be a file-directory structure in a file system.

The repository may also include or be accessible by a version-control system or software therefor. Some examples of version-control software include Source Code Control System (SCCS), Revision Control System (RCS), Concurrent Versions System (CVS), Subversion (SVN), Mercurial (Hg), BitKeeper, and Git, to name a few non-limiting examples. Other methods of browsing repositories may include repository browsers or document-management systems (DMS), which may be customized to work with a particular version-control system and simultaneously browse, search, and/or compare multiple versions of a given file. Additionally, or alternatively, other known search techniques may be used, such as recursive text searching, pattern matching, metadata searching, etc.

In a given code base or repository, textual changes may be made somewhere in an application's source code. These changes may be stored in a version-control system, for example. Such a version-control system may be configured to create a report of changes in a given software version. The report may contain, for example, a name of a developer making a particular change, actual changes, as well as comments added by the developer for each change.

Such reports or change logs may be useful for determining occurrences of a given text string, and from there look up reasons and context for a given change of this given text string and the developer making the change. In some embodiments, commit(s) for the change may contain a reference to an issue-tracking system, which may provide additional information. Thus a cross-reference program may be created and/or used to build a cross-reference index, showing, for a given change, the respective developer, issue-tracking ID, and the reasons for the change, as well as a given changed text string's state before and/or after the change. This contextual information for the changed text string maybe used to track down a location of a given text string in question. Other approaches and embodiments may be realized for similar purposes, as described further below.

In some embodiments, a given application may be equipped with a debug mode. For example, a web application as described in related U.S. patent application Ser. No. 15/965,604, referenced above and incorporated herein, may augment some specified appearance(s) of a text string on a given web page with a unique identifier, such as a key, corresponding to that text string; thus each string may have a unique property key. Such key(s) may have unassigned values and/or be displayed by name in a debug mode, for example, and not displayed in a normal running mode, according to some embodiments. While this debugging information may distract a human user or tester of the web application who may try to view the page in the course of normal use or testing, such debugging information may be useful for a computer program (e.g., automated test tool, manual debug tool, etc.) loading the web page to perform test discovery programmatically, automatically finding output text strings and relating them to corresponding locations in a source repository, for example.

Such a text location-discovery program may search through text appearing on a web page, and then build a cross-reference index from the keys of each text string to an address or Uniform Resource Locator (URL) of the web page. Additionally, the text location discovery program may automatically navigate via links on a web page, or recursively navigate through multiple levels of links on subsequent web pages, fill out forms, click/tap on buttons, etc. In this way, the text location-discovery program may discover pages of a web application by itself, in a manner similar to that of a web crawler used in a search engine, for example.

Combining these features may allow such a text location-discovery program to generate a code-base index showing, for each text string that gets translated, where in the web application the text string appears. This functionality and/or code-base index may, in some use cases, allow quality assurance (QA) personnel to locate translated text strings quickly, such as to review them in actual context of a web page in which the translated text strings appear. Using the same concept, a test suite for the web application may be implemented to navigate to all or most web pages of the web application, with a high degree of code coverage, to record text strings and/or other localization objects on the pages, and to cross-reference or build the described code-base index, in some embodiments.

In addition to the debug mode or debugger of Ser. No. 15/965,604, functionality may be added to allow automatic detection of text strings and their respective locations in at least one code base, without requiring a human user to interact with the web application debugger to navigate to pages, etc. Thus, by automating the process in accordance with the enhanced techniques described herein, an automated debugger or test tool may reach additional pages that may be time-consuming to access by a human tester and/or otherwise difficult or impossible to detect by a web crawler (e.g., pages depending on a relatively long sequence of actions, or on special input in certain form fields).

FIG. 1 is a block diagram illustrating an example architecture that may accommodate automatic text discovery in a web application, according to an embodiment. Other variations of this architecture may accommodate automatic text discovery within the scope of this disclosure.

An example architecture 100, such as of a web application, platform, system, or program, for example, may include a code base 110, code-base index 120, and UI 130. A part of the UI 130 may include UI output 132. UI 130 may include other parts not shown here in FIG. 1. Code base 110 may include localization objects 112, which may include at least one localization object 112a, 112b, etc. Each localization object may correspond to a unique identifier (UID), e.g., UID 142a corresponding to localization object 112a, UID 142b corresponding to localization object 142b, and so on.

A unique identifier may be a key, which may, in some embodiments, have a unique descriptive name, and may include a locale tag, which may be set globally or locally, including by a user and/or by an administrator, for example.

In other embodiments, a unique identifier may be a symbol, hash value, or other unique reference. UIDs may be paired with content corresponding to the localization object, e.g., content 144a for localization object 112a corresponding to UID 142a, and so on. Content 144a, 144b, etc., in some embodiments, may comprise a text string, image, animation, video, audio, or any combination thereof.

Corresponding to localization objects 112, UI output 132 may comprise references to the localization objects by way of their unique identifiers. For example, UI output 132 may be configured to output content 144b unconditionally. Content 144b may be a text string, for example. By having a function 172b to output or print, which may reference the UID 142b, the result of the output may be content 144b (not shown in UI output 132). UI output 132 may also account for a condition. For example, if there is an invalid UI input (not shown), in this case, an output function 172a may be configured to print content 144a (not shown in UI output 132) as a result of referencing UID 142a. Thus, code base 110 contains a first instance of UID 142a and a first instance of 142b, and UI output 132 has corresponding second instances of UID 142a and UID 142b, by reference, even if certain conditions are not satisfied in every use case.

Code-base index 120 may be configured to cross-reference these first and second instances of unique identifiers across code base 110 and UI output 132, according to some embodiments. Code-base location may include, for example, a given pathname, filename, line number, column number, range, or any combination thereof, to provide a few non-limiting examples. The output location may include, for example, a uniform resource locator (URL), uniform resource identifier (URI), breadcrumb, pathname, filename, line number, column number, range, or any combination thereof, to provide a few non-limiting examples. In the depicted example of code-base index 120, path 152a corresponds to UID 142a, and is cross-referenced with URL 162a; path 152b corresponds to UID 142b, and is cross-referenced with URL 162b; and so on. If more specificity is preferred or needed, such as where output locations may be the same for multiple corresponding unique identifiers, additional position information may be included, in some embodiments.

Additional description of these elements, interactions between these elements, and other handling of these elements is found further below. Other combinations, configurations, and arrangements of similar elements is additionally possible—the enhanced techniques described herein are not limited to the configuration depicted in FIG. 1.

Figure 2:
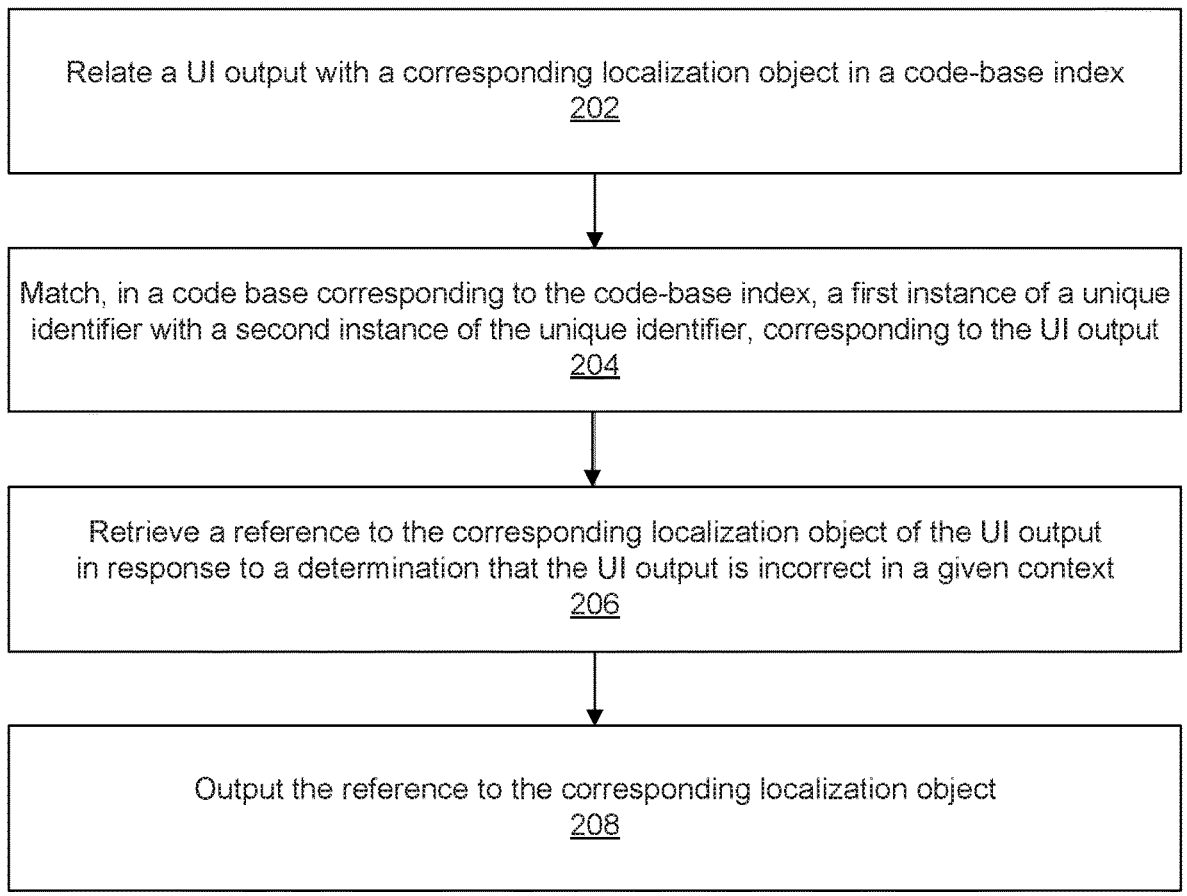
FIG. 2 is a flowchart illustrating an example of an automatic text discovery process, according to an embodiment.

FIG. 2 shows a flowchart illustrating an example process 200 for automatic discovery of locations of translated text in localized applications, according to an embodiment. Process 200 may be performed by processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order from that shown in FIG. 2, as will be understood by a person of ordinary skill in the art. Process 200 shall be described with reference to FIGS. 2 and 5. However, process 200 is not limited to those example embodiments.

In 202, at least one processor 404 may relate a UI output with a corresponding localization object in a code-base index. In an embodiment, the code-base index may a text file, data stream, database, or other data structure, populated with information that may be used to cross-reference or index UI outputs, e.g., text strings, images, animations, videos, sounds, etc., with corresponding locations in a code base.

The code base may be a repository, for example, or may include multiple repositories, such as a first repository for program source code and a second repository for localization data, translation files, key-value pairs, profiles, etc. In some embodiments, a localization object may be any instance of content of such localization data, e.g., a translation file or profile in its entirety, a given key-value pair, such as in a translation file or profile, or any set or combination thereof.

In some embodiments, the content of this second repository may exist as a (sub)directory in the first repository or within a branch of the first repository, for example. For purposes of process 200, the relative location of localization objects with respect to other program code may be varied across different embodiments without changing the overall effects of process 200.

To relate the UI output with the corresponding localization object in the code-base index, processor(s) 404 may create, append, or modify at least one entry in the code-base index, providing information to the code-base index that may identify a given UI output (e.g., by the identity or the content of a text string, and/or by reference or pointer to a memory location containing) and link the given UI output identified to at least one specific location in the code base, in some embodiments. A specific location in the code base may include, for example, a given pathname, filename, line number, column number, range, or any combination thereof, to provide a few non-limiting examples.

In 204, processor 404 may match, in a code base corresponding to the code-base index, a first instance of a unique identifier with a second instance of the unique identifier corresponding to the UI output. In an embodiment, the first instance of the unique identifier may exist in the code base containing the localization data, in which case, the first instance of the unique identifier may be a key of a key-value pair in a localization profile or translation file, for example.

Separately, the second instance of the unique identifier, corresponding to the UI output, may be a call or reference in code that may be rendered for output, e.g., in a web page, web application, output file, printout, or other output—as such, the code that may be rendered for such corresponding output may be, to name a few examples, Hypertext Markup Language (HTML), Extensible Markup Language (XML) User Interface Language (XUL), or a call (system call, library call, function call, etc.) in virtually any other language to enable output according to a dereferenced value corresponding to the unique identifier.

Thus, in an embodiment, the second instance of the unique identifier may be an argument to an output function or rendering field, and the matching may be for a text string of a corresponding key in a localization profile, where the corresponding key may include the first instance of the unique identifier. In such a scenario, actual output may include a value that corresponds to the matched key in a key-value pair of the localization profile, for example. The key-value pair, in this case, may be considered to be a localization object, as described above.

In 206, processor 404 may retrieve a reference to the corresponding localization object of the UI output in response to a determination that the UI output is incorrect in a given context. In an embodiment, the determination may be a manual determination by a localization expert, such as a proofreader, translator, UI/UX (user experience) designer, software tester, and/or software developer. In other embodiments, the determination may be an automatic determination on the basis of at least one of multiple potential test conditions to identify errors or incorrectly translated text in a given context of a UI output.

An example of a UI output being incorrect in a given context, in an embodiment, may be a lack of noun-adjective agreement or subject-verb agreement, for example, as a result of mismatched case declensions, mismatched number, mismatched gender, etc. In an embodiment, such incorrect translations may be nonexistent in any one localization object per se, but rather in a combination of localization objects together, in which one or more localization objects of the combined localization objects may cause the UI output to be incorrect in the given context, such as the context of the combination of the localization objects, for example.

Another example where context may be helpful is where UI output may include polysemy or polysemic terms. Localizations may need context in order to disambiguate polysemic terms as used in the source text. According to some embodiments, special handling may be used for the term "customer," which may refer to a client of a company, such as another business, or may separately refer to an end consumer of an e-commerce site—these senses of the term "customer" may be differentiated in some locales, even if they are treated the same way in the native source locale for which an application may be developed. Without sufficient context of UI output as it would actually appear in a given application, effective and successful review of some localizations may be rendered difficult or impossible, in some cases.

Thus, in some embodiments, localization testing may be automated, in some embodiments, by means of pattern matching, heuristics, neural networks, artificial intelligence, machine learning, other applicable algorithms, or any combination thereof, such as to flag errors or potentially incorrect text, for example, by applying rules to identify frequent patterns of faulty agreement by context-insensitive concatenation of strings or other contextually mismatched text that may be found in localized UI outputs for a given localization target language. Such patterns may be considered as known vague language, in addition to other possibilities that may be specified as predetermined ambiguous text strings, which may be compared with UI outputs being tested.

In further embodiments, the determination that the UI output is incorrect in a given context need not be completely certain of incorrectness, but rather may be a level of confidence or probability over a threshold that the text is incorrect or may be incorrect, for example. In embodiments where text or translation text may be content of an image, video, or audio output, for example, processor 404 may use metadata tags, optical character recognition (OCR), content-based retrieval, content-based fingerprints or signatures, speech-to-text conversion, or other means to identify content of localization objects to flag potentially incorrect text.

Additionally, in 206, to retrieve a reference to the corresponding localization object of the UI output, processor 404 may be further configured to identify at least one of a source code file or markup file that may be rendered for the UI output corresponding to the localization object, thus containing the second instance of the unique identifier corresponding to the UI output.

In an embodiment, the identification of the source code file or markup file may be already cross-referenced in the code-base index, to dereference both the first and second instances of the unique identifier corresponding to the UI output, thereby retrieving the reference to the corresponding localization object corresponding to the UI output. However, in cases where the second instance of the unique identifier is not already cross-referenced, an identification of a source file or markup file containing the second instance of the unique identifier can be made, e.g., by determining a file path, file name (filename), navigation path, and/or URL leading to the second instance of the unique identifier.

As demonstrated with respect to 206 above, the "reference" to the corresponding localization object of the UI output may refer to a call to the localization object (e.g., function argument using the second instance of the unique identifier) and/or the location of that call (e.g., path of a source file, markup file, URL, etc. containing/invoking the call), in some embodiments.

Thus, retrieval of the reference may involve determining (e.g., from an execution- or retrieval-path resolution) or loading (e.g., from a cross-reference entry in an index) an identifier of a location of text, such as in a source code repository and/or a localization repository. Such a location of the text may be further explored or analyzed to make determinations of context for a given localization object, for example. The identifier of the location of the text (e.g., original text or translated text) may include a given pathname, filename, line number, column number, range, or any combination thereof, in some embodiments.

In 208, processor 404 may output the reference to the corresponding localization object. In some embodiments, the output may be to a web browser, debugging tool, translation tool, or any combination thereof, for manual or automated processing of the incorrect UI output. In some embodiments, the output may include copying the reference to the corresponding localization object, into a ticket of a tracking system, ticketing system, bug-reporting system, or issue-reporting system, or issue-tracking system, for example—some non-limiting examples include Bugzilla, Trac, Jira, Redmine, etc.

In such cases, the reference may include a copy of the source or markup code that includes the second instance of the unique identifier, a literal or abridged reproduction of the localization object, a location of the corresponding source code file(s) or markup file(s) (path, URL, etc.) where the second instance of the unique identifier was found, or any combination of the above. In further embodiments, context may also be reproduced in the same or similar output.

For purposes of 206, 208, and/or other aspects of process 200, the code base may be structured in such a way as to include the unique identifier (any instance thereof) in a given context. However, the context of the localization object is its actually displayed UI output may not be readily apparent from the context of the unique identifier per se as found in the code base with its reference(s). In some embodiments, even where the code base is structured to comprise the unique identifier in a given context, testing of the code base or application may be required to determine context of UI output, thus executing or rendering any corresponding code to determine UI output context of the localization object.

In embodiments including graphical user interface (GUI)-based or web application testing, manual or automated testing may further include capturing a screenshot corresponding to the UI output in a given context. Such captured screenshots may additionally be submitted to a ticketing, issue-tracking, or bug-tracking system, as part of a ticket, in some cases. Further, such captured screenshots may include additional context not readily available from any source code in the code base, for example.

Other examples of some localization objects may only be accessible by navigating multiple levels deep into a menu sequence, website, or web application, in some embodiments. A multi-level navigation path, when followed, may thus yield some particular context of certain localization objects, where that context may not be otherwise readily available from the code base simply by means of a text search or proximity search, for example. Additionally, such multi-level navigation paths may be represented by breadcrumbs. A breadcrumb representing the multi-level navigation path for a given test may be generated by processor 404, such as functioning in a capacity of a test system, debug tool, or as part of normal operation of a web site or web application under test, for example.

Testing may include form-field input validation, in some embodiments. For example, some localization objects may not be directly accessible via static pages or default outputs of an application. Instead, such localization objects may only present themselves upon processing certain input, such as valid and/or invalid input values entered via form fields. In such cases, automated testing with form-field validation may improve test time and code coverage, and may yield context information that may otherwise be difficult to access directly from the code base.

As an example of some benefits of applying the enhanced techniques disclosed herein to a web platform of approximately 1300 HTML template files and 28,000 keys (e.g., having 115,000 words in strings), according to an embodiment, the number of distinct web pages that may be displayed to a user (or tester) in this case may be around one thousand, accounting for reuse of the template files in multiple pages, and/or some pages spanning multiple template files, for example. Some pages may have multiple states for display (e.g., a first state when first navigating to a page, a second state upon entry of invalid data and receiving error messages, a third state upon entry of valid data, etc.) Thus, to test a given distinct page, a test of the web platform may require, on average, two additional interactions beyond navigating to the page itself as a separate interaction. Thus, a full test of this example web platform may require a full three thousand interactions by a tester, manual or automated.

In a case of manual testing, using the example web platform discussed above, a given interaction may take about one minute each, on average. Interactions may involve clicking or tapping a button, preparing valid and/or invalid data for input (including text and/or file(s) for upload), copying input data, inputting valid data, inputting invalid data, recording page URLs and/or breadcrumbs, recording UI output for the given page and/or input. In addition to recording UI output per se, for localized web applications, corresponding localization keys may also be recorded (by identification and/or location of the key in a code base, for example), so as to identify localization objects as part of the UI outputs for a localized web application. Recording keys may take an additional 15 seconds per key, as the recording may involve copying key information and page/location information into a separate database or spreadsheet, in some use cases. A given page may reference, for example, 30 keys on average.

Assuming here that each key takes 15 seconds, 30 keys take about 450 seconds, or 7.5 minutes, to record in full for an average page. Adding one minute (60 seconds) to carry out the page interactions, then a full review of each page then would take 510 seconds, or 8.5 minutes, on average. Thus, for a web platform of 3000 pages, full localization review (testing) may require 3000×8.5 minutes=25,500 minutes, or 425 hours, of total time for a manual review, such as by at least one tester, developer, translator, or localization expert, or combination thereof acting as reviewer(s), in some cases, to test a given installation of a localized web application, for each language or locale supported.

Additionally, even if updates to the given web platform or web application do not completely revise text or images throughout the code base, localization testing may still require nearly as much time as in the initial development phase, because it may not otherwise be possible to know on which pages revised text (or revised translated text) may appear. Thus, testers may need to navigate most or all pages of a given installation when an update is performed, resulting in unsustainable growth of work hours and costs to maintain localized applications, in some use cases. Thus, automated testing using cross-referenced localization objects corresponding UI outputs, as disclosed herein, may yield considerable advantages for operation, maintenance, and performance of localized applications.

Testing may be automated using a variety of tools, frameworks, or methodologies, for example. The code base may be validated, such as by static analysis, in some embodiments. In other embodiments, the resulting application may be dynamically analyzed, with focus on actual output, in some cases. In the case of web applications or certain other GUI applications, specialized frameworks for test automation may be used, including Selenium, Capybara, Watir, Robot Framework, xUnit, or any combination thereof, to name a few non-limiting examples. In further embodiments, such automated testing may be performed as part of an approach including continuous integration, continuous deployment, continuous delivery, or any combination thereof.

Depending on the stage and maturity of a given application or its specific progress in internationalization capabilities or specific localizations, certain software testing methodologies or paradigms may be used in parallel or in succession, for example. Additional examples of assessing such project maturity or progress with respect to internationalization and some specific localizations are described further below.

Internationalization Maturity Model for Assessment of Global Software Development Without a structured way of assessing the maturity of their code to support the global expansion of their product, development teams working in locale-specific markets producing software for global markets may be ill-equipped to handle diverse technologies that they may be expected to encounter. This internationalization maturity model may allow development teams to assess where they stand in terms of the ability of their code to work in different locales, and may serve also as a self-guided survey to help guide the team from one level to the next.

Answers to general questions (see below) and questions per technology about use of encodings, support of Unicode/CLDR or other locale provider classes, libraries, etc., may allow development teams to self-assess and be aware of what they must work on to provide the next level of global support in additional languages.

As one example embodiment, an internationalization (i18n) maturity model may appear as shown in FIG. 3, e.g., for US-centric development teams. Any assessments or determinations of levels of maturity in any of various dimensions, e.g., multilingualization (m17n) capabilities, i18n capabilities, organizational status, localization (l10n) status, etc., may be made or automatically generated. In some embodiments, integrated into various phases of manual or automated testing, including automated flagging of issues that may be indicative of maturity level of given module or subproject within an application from that of the application or project overall, for example. While FIG. 3 shows one non-limiting example, virtually any number of combinations, categories, dimensions, etc., may be possible in accordance with this example.

A non-exhaustive, non-limiting list of general questions to a development team for assessing a project's i18n/l10n maturity may include the following:

Part 1—Assessing General I18n Readiness
1) How do you currently support the end users in different locales or languages?
   (a) Is there a language selector or locale selector?
   (b) What does the end-user have to do to see the desired language?
2) Do you distinguish between U language and data locale?
3) Are code and language or locale (l10n) separated into different repositories?
   (a) Does the code need to be rebuilt if changes to the UI languages are made?
4) How does deployment of the foreign languages work?
5) How are the languages rendered?
   (a) At run-time from language packs or is each language a code version?
6) Is pseudolocalization used consistently to qualify a feature before release?
7) Are developers aware and trained in i18n requirements?
8) How are i18n defects tracked?
   (a) Are they separated from linguistic issues?
9) How much automation, if any, is available to support proper i18n?
10) Is l10n accounted for in a continuous integration and deployment model?
11) Is text separated from graphics?
    (a) Are graphics culturally aware?
    (b) Can a different graphic be supported for a different locale?
12) Is there a feedback mechanism for foreign users?
    (a) Is there a dedicated feedback mechanism for l10n issues?

Part 2: Technology-Specific Level Assessment and Guidance (FIG. 4)

FIG. 4 shows a chart illustrating an example assessment of i18n maturity of a Java web application under test, according to one non-limiting example embodiment. In this particular example, a template of six maturity levels is provided, along with a corresponding list of configuration settings for the Java application, originally as a blank list.

A developer, tester, or automated test tool or test suite, may fill appropriate entries of the blank list of configuration settings with existing configuration settings or suggested configuration settings in parts of the configuration settings list that correspond to appropriate maturity levels for the corresponding configuration settings. While FIG. 4 shows one non-limiting example, virtually any number of combinations, categories, dimensions, etc., may be possible in accordance with this example.

Example Computer System

Figure 5:
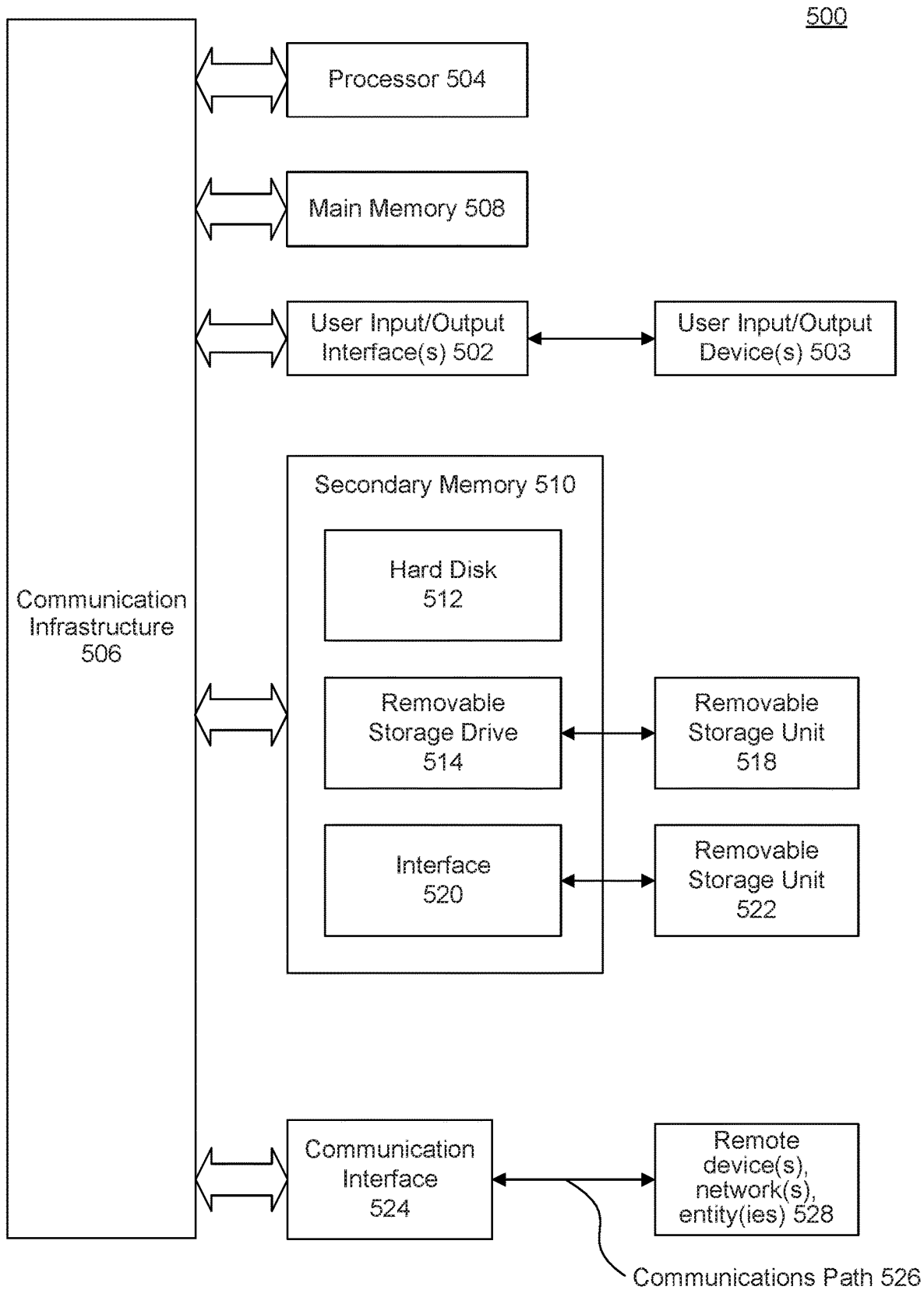
FIG. 5 is a diagram depicting an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 504 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or secondary memory 510. Secondary memory 510 may include, for example, a main storage drive 512 and/or a removable storage device or drive 514. Main storage drive 512 may be a hard disk drive or solid-state drive, for example. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software (e.g., "on-premise" cloud-based solutions), "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. A method, comprising:
   discovering, by at least one computer processor, at least one localization object of a plurality of localization objects in a software user interface (UI) to be localized according to a localization target;
   relating, by the at least one computer processor, a UI output with a corresponding localization object of the plurality of localization objects in a code-base index;
   matching, by the at least one computer processor, a first instance of a unique identifier with a second instance of the unique identifier,
      wherein the first instance of the unique identifier is located in a code base corresponding to the code-base index,
      wherein the second instance of the unique identifier corresponds to the UI output, and
      wherein the code base is structured to comprise the unique identifier in a given context among the plurality of localization objects;
   retrieving, by the at least one computer processor, a reference to the corresponding localization object related to the UI output in response to a determination, per a rule configured to identify a pattern of faulty agreement, that the UI output is mismatched with the given context among the plurality of localization objects, with respect to the localization target; and
   outputting, by the at least one computer processor, the reference to the corresponding localization object in the code-base index into a ticket of an issue-tracking system responsive to the determination that the UI output is mismatched, wherein the corresponding localization object is accessible from the ticket using the reference to the corresponding localization object.

2. The method of claim 1, wherein the given context comprises a result of a form-field input validation.

3. The method of claim 1, wherein the given context comprises a result of the discovering via a multi-level navigation path.

4. The method of claim 3, further comprising:
   generating, by the at least one computer processor, a breadcrumb representing the multi-level navigation path.

5. The method of claim 1, wherein the determination that the UI output is mismatched with the given context comprises a result of a comparison with a predetermined ambiguous text string.

6. The method of claim 1, wherein the determination further comprises a heuristic function, a machine-learning process, or a combination thereof.

7. The method of claim 1, wherein the rule is further configured to identify a polysemic input.

8. The method of claim 1, wherein the rule is further configured to identify a predetermined ambiguity.

9. The method of claim 1, wherein at least the discovering and the relating are performed in response to a change to the software UI.

10. The method of claim 1, wherein at least the discovering and the relating are performed within a process of continuous integration, continuous deployment, continuous delivery, or a combination thereof.

11. The method of claim 1, wherein at least the retrieving is performed using a framework for test automation.

12. A system, comprising:
    a memory; and
    at least one computer processor coupled to the memory and configured to:
       discover at least one localization object of a plurality of localization objects in a software user interface (UI) to be localized according to a localization target;
       relate a UI output with a corresponding localization object of the plurality of localization objects in a code-base index;
       match a first instance of a unique identifier with a second instance of the unique identifier,
          wherein the first instance of the unique identifier is located in a code base corresponding to the code-base index,
          wherein the second instance of the unique identifier corresponds to the UI output, and
          wherein the code base is structured to comprise the unique identifier in a given context among the plurality of localization objects;
       retrieve a reference to the corresponding localization object related to the UI output in response to a determination, per a rule configured to identify a pattern of faulty agreement, that the UI output is mismatched with the given context among the plurality of localization objects, with respect to the localization target; and
       output the reference to the corresponding localization object in the code-base index into a ticket of an issue-tracking system responsive to the determination that the UI output is mismatched, wherein the corresponding localization object is accessible from the ticket using the reference to the corresponding localization object.

13. The system of claim 12, wherein the given context comprises a result of a form-field input validation.

14. The system of claim 12, wherein the given context comprises a result of the discovering via a multi-level navigation path.

15. The system of claim 14, wherein the at least one computer processor is further configured to:
generate a breadcrumb representing the multi-level navigation path.

16. The system of claim 12, wherein the determination that the UI output is mismatched with the given context comprises a result of a comparison with a predetermined ambiguous text string.

17. A non-transitory computer-readable storage medium having instructions stored thereon that, when executed by at least one computing device, causes the at least one computing device to perform operations comprising:
discovering at least one localization object of a plurality of localization objects in a software user interface (UI) to be localized according to a localization target;
relating a UI output with a corresponding localization object of the plurality of localization objects in a code-base index;
matching a first instance of a unique identifier with a second instance of the unique identifier,
wherein the first instance of the unique identifier is located in a code base corresponding to the code-base index,
wherein the second instance of the unique identifier corresponds to the UI output, and
wherein the code base is structured to comprise the unique identifier in a given context among the plurality of localization objects;
retrieving a reference to the corresponding localization object related to the UI output in response to a determination, per a rule configured to identify a pattern of faulty agreement, that the UI output is mismatched with the given context among the plurality of localization objects, with respect to the localization target; and
outputting the reference to the corresponding localization object in the code-base index into a ticket of an issue-tracking system responsive to the determination that the UI output is mismatched, wherein the corresponding localization object is accessible from the ticket using the reference to the corresponding localization object.

18. The non-transitory computer-readable storage medium of claim 17, wherein the given context comprises a result of a form-field input validation.

19. The non-transitory computer-readable storage medium of claim 17, wherein the given context comprises a result of the discovering via a multi-level navigation path.

20. The non-transitory computer-readable storage medium of claim 19, the operations further comprising:
generating a breadcrumb representing the multi-level navigation path.

21. The non-transitory computer-readable storage medium of claim 17, wherein the determination that the UI output is mismatched with the given context comprises a result of a comparison with a predetermined ambiguous text string.

* * * * *